US012801684B2

(12) United States Patent
Alyousuf et al.

(10) Patent No.: US 12,801,684 B2
(45) Date of Patent: Nov. 17, 2026

(54) METHODS AND SYSTEMS FOR DETERMINING THE LOCATION OF A HYDROCARBON RESERVOIR USING AN UNSUPERVISED CLUSTERING TECHNIQUE FOR INVERSION REGULARIZATION

(71) Applicant: SAUDI ARABIAN OIL COMPANY, Dhahran (SA)

(72) Inventors: Taqi Yousuf Alyousuf, Sayhat (SA); Daniele Colombo, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 882 days.

(21) Appl. No.: 18/303,316

(22) Filed: Apr. 19, 2023

(65) Prior Publication Data

US 2024/0354361 A1 Oct. 24, 2024

(51) Int. Cl.
*G06F 17/11* (2006.01)
*G06F 17/18* (2006.01)

(52) U.S. Cl.
CPC .................................... *G06F 17/11* (2013.01)

(58) Field of Classification Search
CPC ........... G06F 17/11; G06F 17/18; G01V 1/48; G01V 1/50; G01V 2210/624; G06N 20/00; G06N 3/00
See application file for complete search history.

(56) References Cited

U.S. PATENT DOCUMENTS 8,918,288 B2 12/2014 Chok et al.
9,453,929 B2 9/2016 Schmedes et al.
(Continued)

FOREIGN PATENT DOCUMENTS

CN 103257360 A 8/2013
CN 114137610 A 3/2022
(Continued)

OTHER PUBLICATIONS

Duda, R.O. et al.; "Pattern Classification and Scene Analysis (2nd ed.) Part 1: Pattern Classification", vol. 3: Wiley New York, Feb. 27, 1995 (69 pages).

Dunn, J.C., "Well-Separated Clusters and Optimal fuzzy Partitions", Journal of Cybernetics, 1974, vol. 4, No. 1, pp. 95-104 (11 pages).

(Continued)

*Primary Examiner* — Brian W Wathen
(74) *Attorney, Agent, or Firm* — Osha Bergman Watanabe & Burton LLP

(57) ABSTRACT

A method for determining a location of a hydrocarbon reservoir. The method may include receiving a cluster number and a parameter vector, wherein the parameter vector represents a spatial distribution of a property over a subsurface. The method may further include receiving observed data and iteratively performing a series of steps until the parameter vector is converged. The steps may include determining a cluster center for each cluster in a plurality of clusters and determining a membership matrix. The steps may further include processing the parameter vector with a forward operator to produce predicted data and determining an update parameter vector guided by a composite objective function composed of a data misfit function and a clustering term. The steps may still further include updating the parameter vector with the update parameter vector. Once converged the parameter vector is used to determine the location of the hydrocarbon reservoir.

20 Claims, 11 Drawing Sheets

(56) References Cited

U.S. PATENT DOCUMENTS

| | | | | |
|---|---|---|---|---|
| 10,739,482 | B2 | 8/2020 | Chen et al. | |
| 2008/0086493 | A1 | 4/2008 | Zhu | |
| 2009/0132568 | A1 | 5/2009 | Syeda-Mahmood et al. | |
| 2020/0041529 | A1* | 2/2020 | Misra | G06N 3/006 |
| 2020/0124753 | A1* | 4/2020 | Halsey | G01V 1/306 |
| 2021/0026028 | A1 | 1/2021 | Thorne | |
| 2021/0215843 | A1* | 7/2021 | Barajas-Olalde | G01V 1/288 |
| 2021/0270982 | A1 | 9/2021 | Dinh | |
| 2021/0405250 | A1* | 12/2021 | Mayhew | G01V 20/00 |
| 2023/0375735 | A1* | 11/2023 | Liu | G01V 1/301 |
| 2026/0169181 | A1* | 6/2026 | Cheng | G01V 1/282 |

FOREIGN PATENT DOCUMENTS

| | | | |
|---|---|---|---|
| CN | 114781254 | A | 7/2022 |
| WO | 2013/022909 | A1 | 2/2013 |
| WO | 2019/133465 | A1 | 7/2019 |

OTHER PUBLICATIONS

Keho, T.H. et al.; "Focus on land seismic technology: The near-surface challenge", The Leading Edge, vol. 31, No. 1, pp. 62-68 2012 (7 pages).

Sun, J. et al.;"Multidomain petrophysically constrained inversion and geology differentiation using guided fuzzy c-means clustering", Geophysics, vol. 80, No. 4, Jul.-Aug. 2015, pp. ID1-ID18 (19 pages).

Türkoglu E. et al.;"Imaging sand dunes using helicopter-borne TEM data for seismic near-surface corrections", SEG Technical Program Expanded Abstracts, 2018, pp. 2302-2306 (5 pages).

Ravasi, M. et al.; "A joint inversion-segementation approach to assisted seismic interpretation", Geophysical Journal International, vol. 228, No. 2, Sep. 23, 2021 (73 pages).

Ke Y. et al.; "Joint inversion of resistivity and permittivity for two dimensional RMT data based on FCM clustering", Chinese Journal of Geophysics, 2022, vol. 65, No. 6, pp. 2340-2350 (20 pages).

Kieu D.T. et al.; "Seismic-impedance inversion with fuzzy clustering constraints: an example from the Carlin Gold District, Nevada, USA", Geophysical Prospecting, 2020, vol. 68, No. 1, pp. 103-128 (26 pages).

Fan, Z. et al.; "Application and visualization of typical clustering algorithms in seismic data analysis", 10th International conference on ANT, Procedia Computer Science, vol. 151 (2019) pp. 171-178 (8 pages).

Maag, E., "Discrete valued gravity inversion using the guided fuzzy C means clustering technique", Geophysics, vol. 83, No. 4 (Jul.-Aug. 2018) pp. G59-G77 (19 pages).

Rapstine, T. et al.; "Integrating a spatial salt likelihood map and prior petrophysical data into a gracity gradiometry Inversion through fuzzy c-means clustering", Geophysical Prospecting, SEG International Exposition and 87th Annual Meeting, 2016, pp. 1622-1626 (5 pages).

* cited by examiner

METHODS AND SYSTEMS FOR DETERMINING THE LOCATION OF A HYDROCARBON RESERVOIR USING AN UNSUPERVISED CLUSTERING TECHNIQUE FOR INVERSION REGULARIZATION

BACKGROUND

Oil and gas extraction from subsurface rock formations requires the drilling of wells using drilling rigs mounted on the ground or on offshore rig platforms. Once drilled, the wells may access hydrocarbon reservoirs. Reservoir characterization, such as assessments of reservoir quality, are typically performed using one or more models of the subsurface over a region of interest.

Subsurface models may include spatial distributions of properties of the subsurface formations. For example, subsurface models may indicate the density and/or resistivity throughout a subsurface volume in a region of interest (e.g., near or encompassing a reservoir). In many instances, subsurface properties of interest for reservoir characterization and well site planning cannot be directly measured. Or, at least, these properties cannot be directly measured throughout an entire subsurface volume with sufficient resolution. However, in many instances, subsurface properties can be considered causal factors that affect one or more quantities that can be directly measured or observed. For example, the density of the subsurface affects the gravitational field. Thus, in theory, observations of the gravitational field can be used to determine the density of the subsurface throughout a subsurface volume. Determining, from a set of observations, the causal factor(s) that produced the observations, is commonly referred to as an inverse problem. In practice, inverse problems in geophysical applications are often ill-posed and, given a set of observations, can produce a large number of non-unique solutions each of which satisfy the recorded data. Further, many of the solutions can be inconsistent with known physical constraints on the subsurface (e.g., no negative densities). Accordingly, there exists a need to efficiently guide methods for solving inverse problems to obey known criteria.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

Embodiments disclosed herein generally relate to a method for determining a location of a hydrocarbon reservoir in a subsurface. The method includes receiving a cluster number, wherein the cluster number specifies a number of clusters in a plurality of clusters and receiving a parameter vector, wherein the parameter vector represents a spatial distribution of a property over the subsurface. The method further includes receiving observed data, wherein the property distributed over the subsurface represented by the parameter vector causes an effect in the observed data. The method further includes iteratively performing a series of steps until the parameter vector is converged. The steps include determining a cluster center for each cluster in the plurality of clusters and determining a membership matrix, wherein the membership matrix relates the parameter vector to the plurality of clusters. The steps further include processing the parameter vector with a forward operator to produce predicted data. The steps further include determining an update parameter vector guided by a composite objective function, wherein the composite objective function includes a data misfit function that quantifies a difference between the predicted data and the observed data, and a clustering term based on the parameter vector and the cluster centers. The steps further include updating the parameter vector with the update parameter vector and determining, using the update parameter vector, if the parameter vector is converged. The method further includes determining the location of the hydrocarbon reservoir in the subsurface using the parameter vector.

Embodiments disclosed herein generally relate to a non-transitory computer-readable memory that includes computer-executable instructions stored thereon that, when executed on a processor, cause the processor to perform steps that determine a location of a hydrocarbon reservoir in a subsurface. The steps include receiving a cluster number, wherein the cluster number specifies a number of clusters in a plurality of clusters and receiving a parameter vector, wherein the parameter vector represents a spatial distribution of a property over the subsurface. The steps further include receiving observed data, wherein the property distributed over the subsurface represented by the parameter vector causes an effect in the observed data. The steps further include iteratively, until the parameter vector is converged: determining a cluster center for each cluster in the plurality of clusters and determining a membership matrix, wherein the membership matrix relates the parameter vector to the plurality of clusters; processing the parameter vector with a forward operator to produce predicted data; determining an update parameter vector guided by a composite objective function, wherein the composite objective function includes a data misfit function that quantifies a difference between the predicted data and the observed data and a clustering term based on the parameter vector and the cluster centers; updating the parameter vector with the update parameter vector, and; determining, using the update parameter vector, if the parameter vector is converged. The steps further include determining the location of the hydrocarbon reservoir in the subsurface using the parameter vector.

Embodiments disclosed herein generally relate to a system that includes a computer processor used to determine the location of a hydrocarbon reservoir in a subsurface. The computer processor is configured to receive a cluster number, wherein the cluster number specifies a number of clusters in a plurality of clusters and receive a parameter vector, wherein the parameter vector represents the spatial distribution of a property over the subsurface. The computer processor is further configured to receive observed data, wherein the property distributed over the subsurface represented by the parameter vector causes an effect in the observed data. The computer processor is further configured to iteratively perform a series of steps until the parameter vector is converged. The steps include determining a cluster center for each cluster in the plurality of clusters and determining a membership matrix, wherein the membership matrix relates the parameter vector to the plurality of clusters. The steps further include processing the parameter vector with a forward operator to produce predicted data and determining an update parameter vector guided by a composite objective function that includes a data misfit function that quantifies the difference between the predicted data and the observed data, and a clustering term based on the parameter vector and the cluster centers. The steps further include updating the parameter vector with the update parameter vector and determining, using the update parameter vector, if the parameter vector is converged. The computer processor is further configured to determine the location of the hydrocarbon reservoir in the subsurface using the parameter vector.

Other aspects and advantages of the claimed subject matter will be apparent from the following description and the appended claims.

DETAILED DESCRIPTION

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as using the terms "before," "after," "single," and other such terminology. Rather, the use of ordinal numbers is to distinguish between the elements. By way of an example, a first element is distinct from a second element, and the first element may encompass more than one element and succeed (or precede) the second element in an ordering of elements.

It is to be understood that the singular forms "a," "an," and "the" include plural referents unless the context clearly dictates otherwise. Thus, for example, reference to "a parameter" includes reference to one or more of such parameters.

Terms such as "approximately," "substantially," etc., mean that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

It is to be understood that one or more of the steps shown in the flowcharts may be omitted, repeated, and/or performed in a different order than the order shown. Accordingly, the scope disclosed herein should not be considered limited to the specific arrangement of steps shown in the flowcharts.

Although multiple dependent claims are not introduced, it would be apparent to one of ordinary skill that the subject matter of the dependent claims of one or more embodiments may be combined with other dependent claims.

Figure 1:
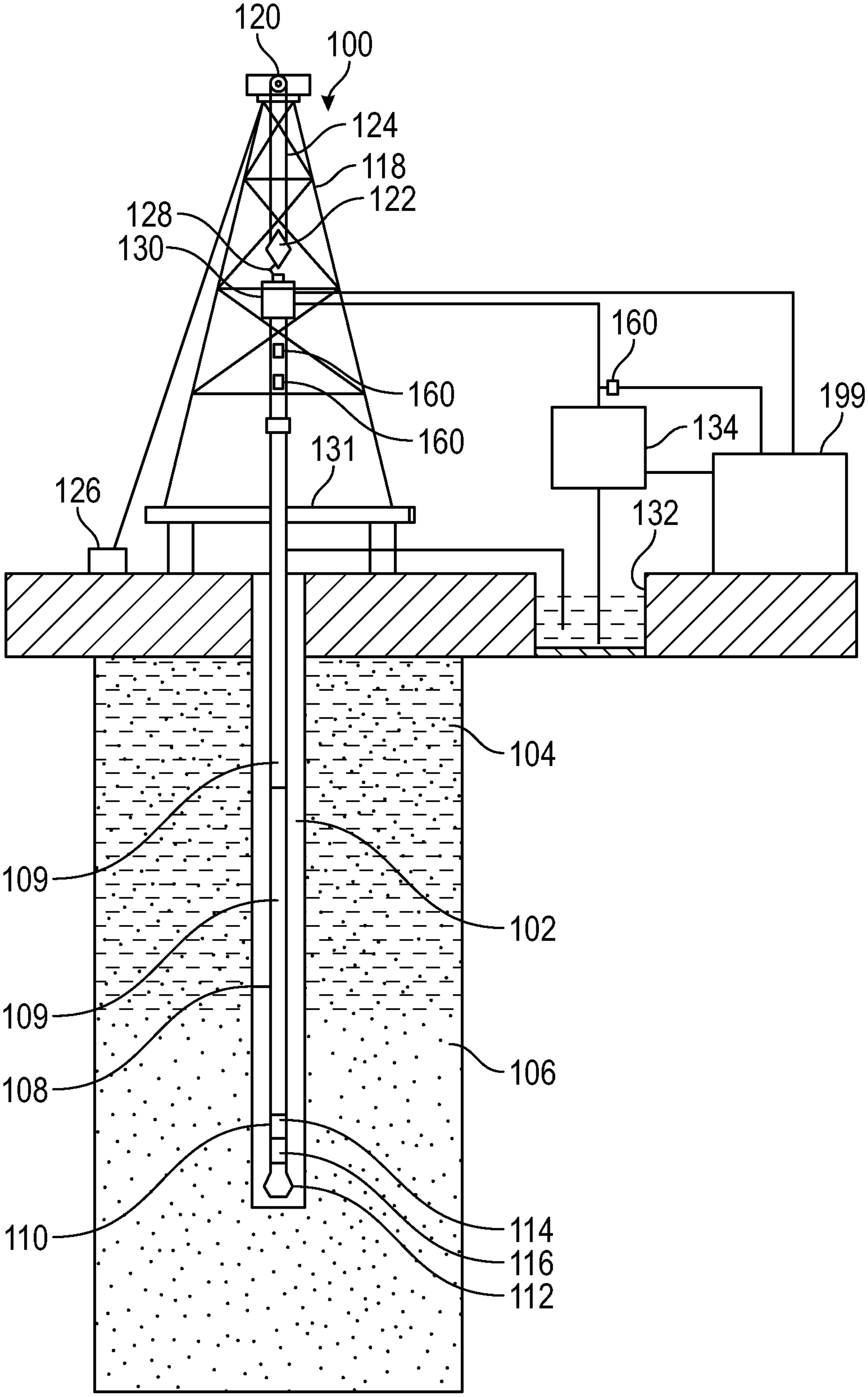
FIG. 1 depicts a well site in accordance with one or more embodiments.

FIG. 1 depicts a simplified well site (100). In general, well sites may be configured in a myriad of ways. Therefore, the illustrated well site (100) of FIG. 1 is not intended to be limiting with respect to the particular configuration of the drilling equipment. The well site (100) is depicted as being on land. In other examples, the well site (100) may be offshore, and drilling may be carried out with or without use of a marine riser. A drilling operation at well site (100) may include drilling a wellbore (102) into a subsurface including various formations (104, 106). The wellbore (102) may include a bored hole that extends from the surface into a target zone of the subsurface formations (104, 106), such as a reservoir. The subsurface formations (104, 106) may be categorized by various formation properties of interest, such as formation porosity, formation permeability, resistivity, density, water saturation, total organic content and the like. Properties of the subsurface formations (104, 106) may vary spatially.

For the purpose of drilling a new section of wellbore (102), a drill string (108) is suspended within the wellbore (102). The drill string (108) may include one or more drill pipes (109) connected to form conduit and a bottom hole assembly (BHA) (110) disposed at the distal end of the conduit. The BHA (110) may include a drill bit (112) to cut into the subsurface rock. The BHA (110) may include measurement tools, such as a measurement-while-drilling (MWD) tool (114) and logging-while-drilling (LWD) tool (116). Measurement tools (114, 116) may include sensors and hardware to measure downhole drilling parameters, and these measurements may be transmitted to the surface using any suitable telemetry system known in the art. By means of example, a LWD tool (116) commonly collects information about the properties of the subsurface formations (104, 106). As previously described, these may include, but are not limited to, the density, the porosity, and the resistivity of the subsurface formations (104, 106). The BHA (110) and the drill string (108) may include other drilling tools known in the art but not specifically shown.

The drill string (108) may be suspended in a wellbore (102) by a derrick (118). A crown block (120) may be mounted at the top of the derrick (118), and a traveling block (122) may hang down from the crown block (120) by means of a cable or drilling line (124). One end of the cable (124) may be connected to a draw works (126), which is a reeling device that may be used to adjust the length of the cable (124) so that the traveling block (122) may move up or down the derrick (118). The traveling block (122) may include a hook (128) on which a top drive (130) is supported.

The top drive (130) is coupled to the top of the drill string (108) and is operable to rotate the drill string (108). Alternatively, the drill string (108) may be rotated by means of a rotary table (not shown) on the drilling floor (131). Drilling fluid (commonly called mud) may be stored in a mud pit (132), and at least one pump (134) may pump the mud from the mud pit (132) into the drill string (108). The mud may flow into the drill string (108) through appropriate flow paths in the top drive (130) (or a rotary swivel if a rotary table is used instead of a top drive to rotate the drill string (108)).

In one implementation, a drilling control system (199) may be disposed at or communicate with the well site (100). Drilling control system (199) may control at least a portion of a drilling operation at the well site (100) by providing controls to various components of the drilling operation. In one or more embodiments, the drilling control system (199) may receive data from one or more sensors (160) arranged to measure controllable parameters of the drilling operation. As a nonlimiting example, sensors (160) may be arranged to measure WOB (weight on bit), RPM (drill string rotational speed), GPM (flow rate of the mud pumps), and ROP (rate of penetration of the drilling operation).

Sensors (160) may be positioned to measure parameter(s) related to the rotation of the drill string (108), parameter(s) related to travel of the traveling block (122), which may be used to determine ROP of the drilling operation, and parameter(s) related to flow rate of the pump (134). For illustration purposes, sensors (160) are shown on drill string (108) and proximate mud pump (134). The illustrated locations of sensors (160) are not intended to be limiting, and sensors (160) could be disposed wherever drilling parameters need to be measured. Moreover, there may be many more sensors (160) than shown in FIG. 1 to measure various other parameters of the drilling operation. Each sensor (160) may be configured to measure a desired quantity.

During a drilling operation at the well site (100), the drill string (108) is rotated relative to the wellbore (102), and weight is applied to the drill bit (112) to enable the drill bit (112) to break rock as the drill string (108) is rotated. In some cases, the drill bit (112) may be rotated independently with a drilling motor (not shown). In other embodiments, the drill bit (112) may be rotated using a combination of the drilling motor and the top drive (130) (or a rotary swivel if a rotary table is used instead of a top drive to rotate the drill string (108)). While cutting rock with the drill bit (112), mud is pumped into the drill string (108).

The mud flows down the drill string (108) and exits into the bottom of the wellbore (102) through nozzles in the drill bit (112). The mud in the wellbore (102) then flows back up to the surface in an annular space between the drill string (108) and the wellbore (102) with entrained cuttings. The mud with the cuttings is returned to the mud pit (132) to be circulated back again into the drill string (108). Typically, the cuttings are removed from the mud, and the mud is reconditioned as necessary, before pumping the mud again into the drill string (108). In one or more embodiments, the drilling operation may be controlled by the drilling control system (199).

As noted, the well site (100) provides well logs either through measurement tools (114, 116) while drilling or by post-drilling surveys such as a wireline tool (not shown). Furthermore, data about the subsurface formations (104, 106) near a well site (100) may be obtained by analyzing the entrained cuttings, as a function to drilling depth, exiting the wellbore (102). In addition to data acquired at a well-site, other methods for collecting data and characterizing subsurface formations (104, 106) exist. For example, a seismic survey may be conducted.

Prior to the commencement of drilling, a wellbore plan may be generated. The wellbore plan may include a starting surface location of the wellbore (102), or a subsurface location within an existing wellbore (102), from which the wellbore (102) may be drilled. Further, the wellbore plan may include a terminal location that may intersect with a target zone (e.g., a hydrocarbon-bearing formation) and a planned wellbore path from the starting location to the terminal location. In other words, the wellbore path may intersect a previously located hydrocarbon reservoir.

Typically, the wellbore plan is generated based on best available information at the time of planning from a geophysical model, geomechanical models encapsulating subterranean stress conditions, the trajectory of any existing wellbores (which it may be desirable to avoid), and the existence of other drilling hazards, such as shallow gas pockets, over-pressure zones, and active fault planes The wellbore plan may include wellbore geometry information such as wellbore diameter and inclination angle. If casing is used, the wellbore plan may include casing type or casing depths. Furthermore, the wellbore plan may consider other engineering constraints such as the maximum wellbore curvature ("dog-log") that the drill string (108) may tolerate and the maximum torque and drag values that the drilling system may tolerate.

A wellbore planning system (199) may be used to generate the wellbore plan. The wellbore planning system (199) may comprise one or more computer processors in communication with computer memory containing the geophysical and geomechanical models, information relating to drilling hazards, and the constraints imposed by the limitations of the drill string (108) and the drilling system. The wellbore planning system (199) may further include dedicated software to determine the planned wellbore path and associated drilling parameters, such as the planned wellbore diameter, the location of planned changes of the wellbore diameter, the planned depths at which casing will be inserted to support the wellbore (102) and to prevent formation fluids entering the wellbore, and the drilling mud weights (densities) and types that may be used during drilling the wellbore.

Figure 2:
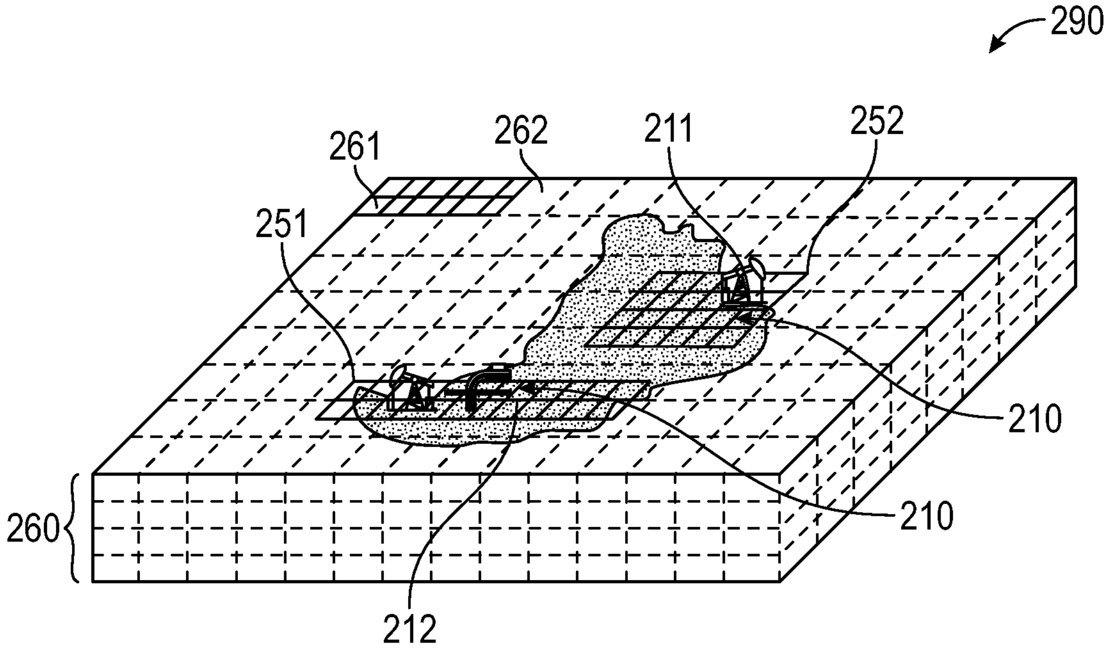
FIG. 2 depicts a reservoir simulation in accordance with one or more embodiments.

Turning to FIG. 2, FIG. 2 shows the basis of a reservoir simulator in accordance with one or more embodiments. FIG. 2 shows a reservoir grid model (290) that corresponds to a geological region. The geological region may span multiple well sites (100) and a subsurface region of interest. The well sites (100) may include injection wells (212), which inject a fluid into the local subsurface formations (104, 106), or an extraction well (211). More specifically, the reservoir grid model (290) includes grid cells (261) that may refer to an original cell of a reservoir grid model as well as coarse grid blocks (262) that may refer to an amalgamation of original cells of the reservoir grid model. For example, a grid cell may be the case of a 1×1 block, where coarse grid blocks may be of sizes 2×2, 4×4, 8×8, etc. Both the grid cells (261) and the coarse grid blocks (262) may correspond to columns for multiple model layers (260) within the reservoir grid model (290).

Prior to performing a reservoir simulation, local grid refinement and coarsening (LGR) may be used to increase or decrease grid resolution in a certain area of reservoir grid model (290). For example, various reservoir properties, e.g., permeability, porosity or saturations, may correspond to a discrete value that is associated with a particular grid cell or coarse grid block. However, by using discrete values to represent a portion of a geological region, a discretization error may occur in a reservoir simulation. Thus, finer grids may reduce discretization errors as the numerical approximation of a finer grid is closer to the exact solution, however through a higher computational cost. As shown in FIG. 2, for example, the reservoir grid model (290) may include various fine-grid models (i.e., fine-grid model A (251), fine-grid model B (252)), that are surrounded by coarse block regions. Likewise, the original reservoir grid model (290) without any coarsening may also be a fine-grid model. In some embodiments, a reservoir grid model (or multiple reservoir grid models) may be used to preform reservoir simulations.

Generally, reservoir simulators solve a set of mathematical governing equations that represent the physical laws that govern fluid flow in porous, permeable media. For example, the flow of a single-phase slightly compressible oil with a constant viscosity and compressibility, equations that capture Darcy's law, the continuity condition, and the equation of state and may be written as:

$$\nabla^2 \rho(x, t) = \frac{\psi \mu c_t}{k} \frac{\partial \rho(x, t)}{\partial t}, \tag{1}$$

where ρ represents fluid in the reservoir, x is a vector representing spatial position and t represents time. ψ, μ, $c_t$, and k represent the physical and petrophysical properties of porosity, fluid viscosity, total combined rock and fluid compressibility, and permeability, respectively. $\nabla^2$ represents the spatial Laplace operator.

Additional, and more complicated equations are required when more than one fluid, or more than one phase, e.g., liquid and gas, are present in the reservoir. Further, when the physical and petrophysical properties of the rocks and fluids vary as a function of position the governing equations may not be solved analytically and must instead be discretized into a grid of cells or blocks (as depicted in FIG. 2). The governing equations must then be solved by one of a variety of numerical methods, such as, without limitation, explicit or implicit finite-difference methods, explicit or implicit finite element methods, or discrete Galerkin methods.

In some embodiments, a reservoir simulator comprises functionality for simulating the flow of fluids, including hydrocarbon fluids such as oil and gas, through a hydrocarbon reservoir composed of porous, permeable reservoir rocks in response to natural and anthropogenic pressure gradients. The reservoir simulator may be used to predict changes in fluid flow, including fluid flow into well penetrating the reservoir as a result of planned well drilling, and fluid injection and extraction. For example, the reservoir simulator may be used to predict changes in hydrocarbon production rate that would result from the injection of water into the reservoir from wells around the reservoirs periphery.

As stated, a reservoir simulator may account for, among other things, the porosity and hydrocarbon storage capacity of the subsurface formations (104, 106) and fluid transport pathways to predict the production rate of hydrocarbons of a well, or a set of wells, over their lifetime.

Under consideration of wellbore planning systems (199), reservoir simulators, and drilling operations, the need for accurate subsurface models is self-evident. Accurate subsurface models are important to reduce exploration risks, plan the location of well sites (100) (i.e., wellbore planning system (199)), optimize reservoir production, improve reservoir characterization, best leverage existing discoveries, and better extend hydrocarbon recovery from existing wells. Generally, a subsurface model contains a digital description of the physical properties of the rocks as a function of position within the subsurface region of interest and the fluids within the pores of the porous, permeable reservoir rocks at a given time. In some embodiments, the digital description may be in the form of a dense 3D grid with the physical properties of the rocks and fluids defined at each node. In some embodiments, the 3D grid may be a cartesian grid, while in other embodiments the grid may be an irregular grid. For example, subsurface models may indicate the density and/or resistivity throughout a subsurface volume in a region of interest (e.g., near or encompassing a reservoir).

The physical properties of the rocks and fluids within the reservoir may be obtained from a variety of geological and geophysical sources. For example, remote sensing geophysical surveys, such as seismic surveys, gravity surveys, and active and passive source resistivity surveys, may be employed. In addition, data collected such as well logs (from measurement tools (114, 116)) and production data acquired in wells penetrating the reservoir may be used to determine physical and petrophysical properties along the segment of the well trajectory traversing the reservoir. For example, porosity, permeability, density, seismic velocity, and resistivity may be measured along these segments of wellbore. Data collected from previously drilled, nearby wells, sometimes called "offset" wells, may also be appended to the collected data. Moreover, so-called "soft" data, such as outcrop information and data describing analogous modern geological or depositional environments may be integrated with the acquired well site (100) data and seismic data to further refine the modeled subsurface formations (104, 106). In accordance with some embodiments, remote sensing geophysical surveys and physical and petrophysical properties determined from well logs may be combined to estimate physical and petrophysical properties for the entire reservoir grid model (290).

While subsurface model data can originate from a variety of sources, the data is often limited to discrete, local locations (e.g., near the wellbore of an existing well) and does not provide sufficient resolution of a subsurface volume for use with a reservoir simulation, or other modeling effort. Further, in many instances, subsurface properties of interest for reservoir characterization and well site planning cannot be directly measured.

In some instances, subsurface properties can be considered causal factors that affect one or more quantities that can be directly measured or observed. For example, the density of the subsurface affects the gravitational field. Thus, in theory, observations of the gravitational field can be used to determine the density of the subsurface throughout a subsurface volume. Determining, from a set of observations, the causal factor(s) that produced the observations, is commonly referred to as an inverse problem. Solution of inverse problems in geophysical applications, and in other scientifical fields, is carried out in the vast majority of cases though linearized approaches where a composite objective function is defined by multiple terms with associated weights or Lagrange multipliers. As will be described in greater detail below, the process is guided by the definition of a forward operator (often nonlinear) that maps the characteristics of a subsurface model (i.e., a parameter or property distribution) to observable geophysical quantities that can be observed from the surface, borehole, or a combination of surface and borehole. Such observable geophysical quantities can be of different types such as, but not limited to: gravity acceleration; magnetic susceptibility; seismic wave travel time or amplitudes; and electromagnetic electric and magnetic field intensity. Given a proposed subsurface model, the forward operator is used to predict the observable quantity. Generally, the predictions are compared to the observed data with a data misfit function (i.e., a component of the composite objective function) and the differences between the prediction and the observed data, along with the misfit function, are used to guide updates to the proposed subsurface model. The composite objective function is typically composed of additional terms that are introduced for regularization purposes, for example, to avoid the propagation of noise and to enforce physical (or physics-based) constraints. In geophysics, constraints are typically related to, or reference, some background knowledge of the geology of the subsurface region of interest. Such constraints can be associated with the property distribution described by the subsurface model. Further, it is noted that several regularization techniques may be grouped under the term of Tikhonov regularization.

Figure 3:
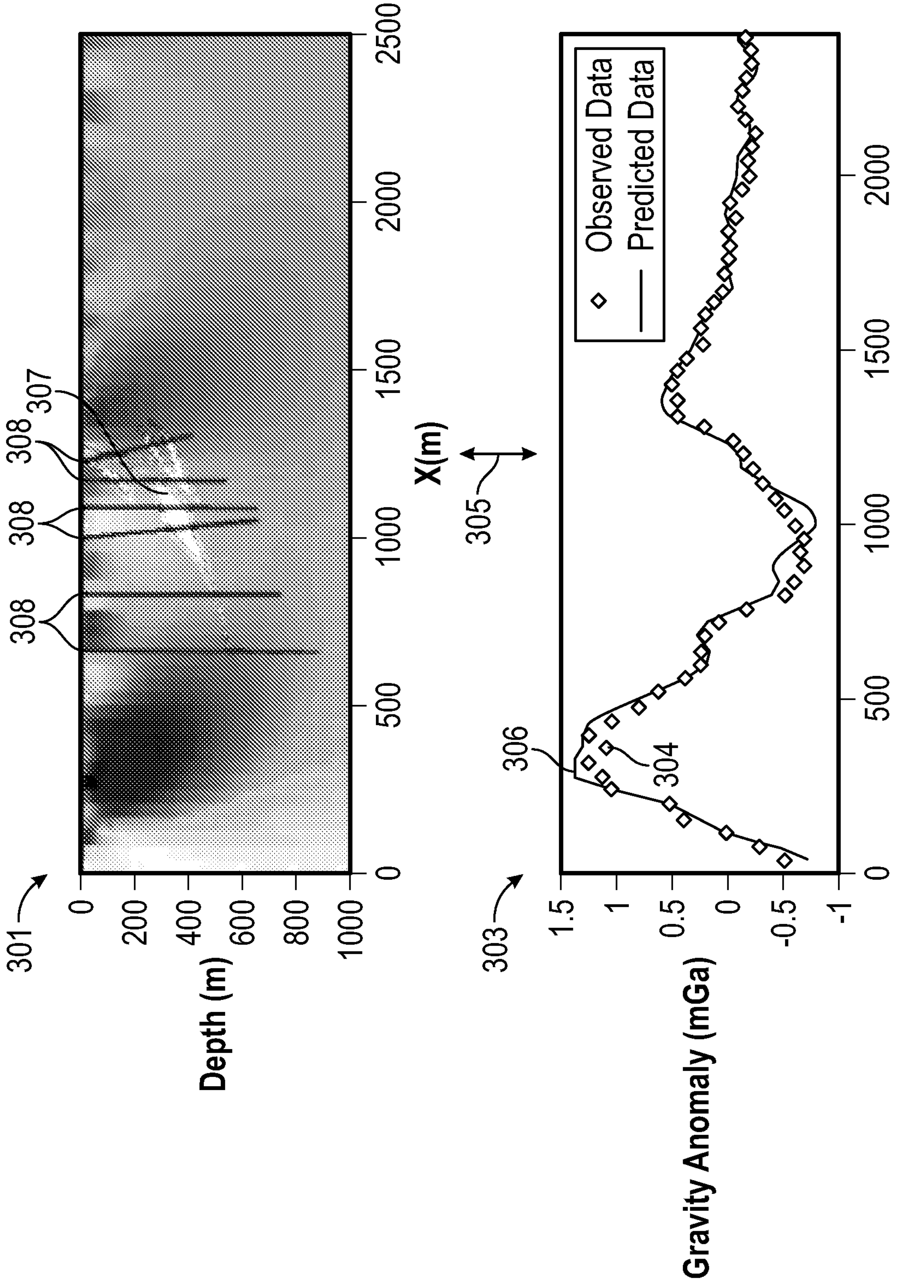
FIG. 3 depicts an observed data set and a subsurface property model in accordance with one or more embodiments.

An example inversion problem is depicted in FIG. 3. The upper panel (301) of FIG. 3 depicts the spatial distribution of density over a two-dimensional slice of a subsurface. The gradation in the upper panel (301) relates to density. The distribution of density throughout the subsurface affects gravity measurements at the surface. Measurements of gravitational anomaly are depicted in the lower panel (303) of FIG. 3. That is, the lower panel (303) depicts observed data (304). The distribution of density (i.e., a proposed subsurface model) is processed with a forward operator to predict gravity values (and thus gravitational anomaly) at the surface. The lower panel (303) further depicts predicted gravity anomaly values at the surface. The predicted data (306) indicates the gravitational anomaly that is expected to occur, as determined by the forward operator, given the spatial distribution of density throughout the subsurface depicted in the upper panel (301). The difference between the observed data (304) and the predicted data (306) is quantified with a misfit function. The misfit function can be used to guide updates to the density distribution. The process of using a forward operator to produce predicted data (306) using the property distribution, comparison of the predicted data (306) to observed data (304), and updating the property distribution can be repeated until the predicted data (304) is acceptably congruent with the observed data (304). So, an interaction (represented with a double-sided arrow (305)) can be said to exist between the upper and lower panels of FIG. 3. Thus, the density of the subsurface can be determined using observed gravity measurements, where the distribution of density in the subsurface is known to affect (or cause) differences in observed gravity. The determined density distribution is a subsurface model. The importance of obtaining accurate subsurface models is emphasized in the upper panel (301) of FIG. 3 as the density distribution of the subsurface is used to identify a reservoir (307) and plan multiple wellbore paths (308).

In general, embodiments disclosed herein relate to a clustering regularization method for single-domain inversion, as opposed to multiparameter inversion. Single-domain inversion refers to the determination of the distribution of a single subsurface property of interest (e.g., density, or resistivity, etc.) using only an associated set of observed data. That is, the inversion is not informed by other property distributions and/or associated observable quantities of the other property distribution, where the other property distributions may be known or may be desired to be determined in a joint manner. To promote generality, the subsurface property of interest at a given spatial location (and possibly a temporal location) is referred to as a parameter, or model parameter. Thus, a set of parameters that describes the property of interest throughout a subsurface volume may be described using a parameter vector. Thus, embodiments disclosed herein relate to a clustering regularization method used to determine the parameter vector (i.e., a single property subsurface model) given associated observable data. As will be described in greater detail below, while performing the desired inversion, embodiments disclosed herein map the parameter vector to a latent space, determine an association of parameters (i.e., clusters) within the parameter vector, and minimize the distance of associated parameters (i.e., parameters residing in the same cluster) through an unsupervised clustering technique. This process imposes a cluster-based regularization during the inversion process that favors the consolidation of parameters to fewer geological units which produces a focusing behavior that enhances the inversion resolution.

In accordance with one or more embodiments, the clustering technique uses so-called "hard clustering" where each parameter in the parameter vector is assigned to, or said to reside in, a single cluster. In one or more embodiments, the clustering technique uses "soft" or "fuzzy" clustering, where each parameter may be associated with, or considered a member of, multiple clusters. In such cases, the membership of a parameter to the clusters is defined with a membership weight vector. Thus, the membership of each of the parameters in the parameter vector to the clusters may be represented with a membership matrix. It is noted that a membership matrix may be used with a hard clustering technique, however, such a matrix would be sparsely populated. In accordance with one or more embodiments, a fuzzy clustering technique commonly known as fuzzy c-means (FCM) clustering is used to determine cluster centers and determine the membership matrix for the parameter vector.

Figure 4:
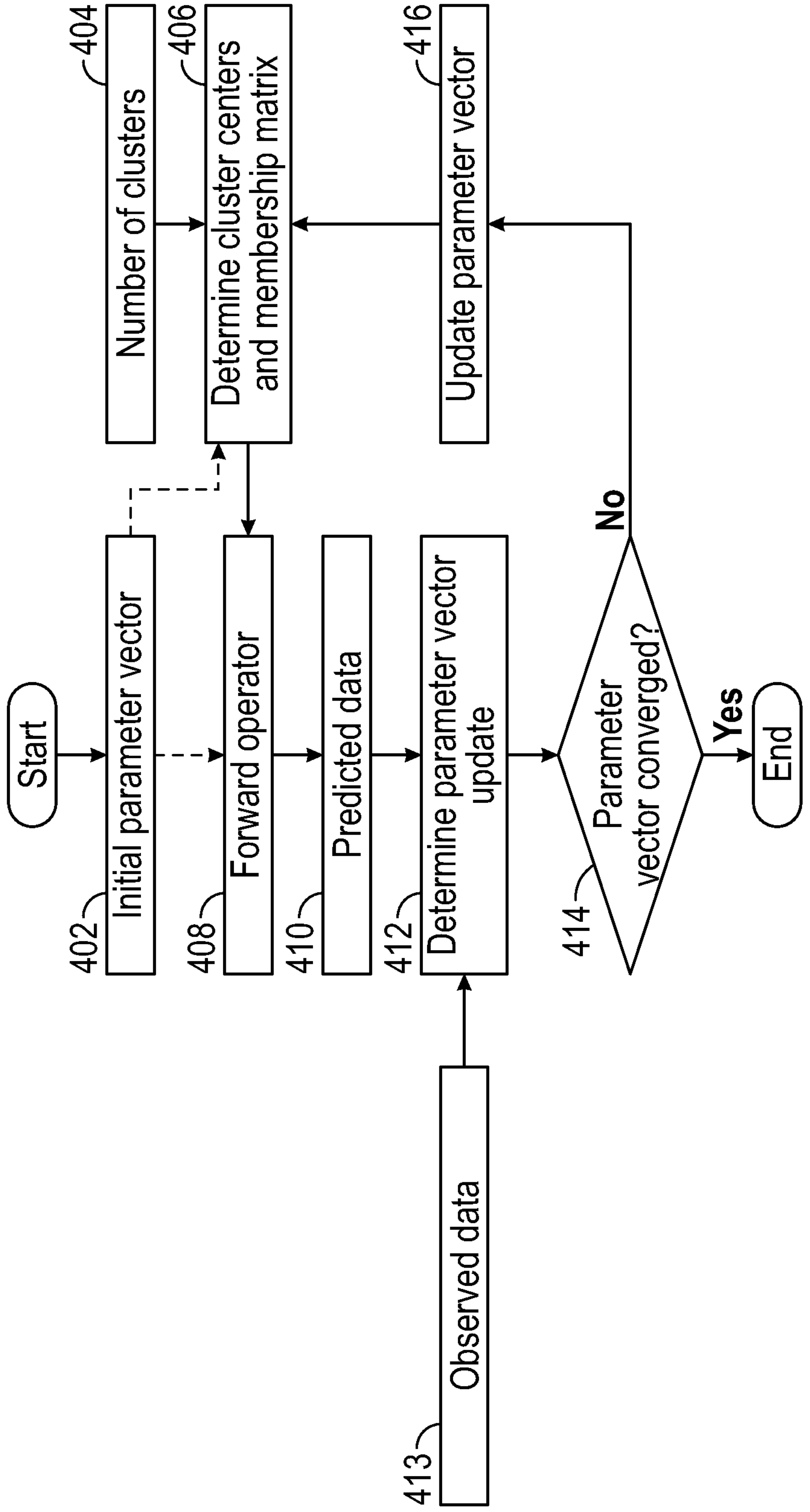
FIG. 4 depicts a flowchart in accordance with one or more embodiments.

FIG. 4 depicts a high-level overview of the clustering regularization method for single-domain inversion, in accordance with one or more embodiments. To begin, as depicted in Block 402, an initial parameter vector is supplied. In one or more embodiments, the initial parameter vector is initialized with values randomly selected from a physically plausible distribution. In other embodiments, the initial parameter vector contains some known parameter values (e.g., near an existing well where direct measurements have been acquired). Further, in accordance with one or more embodiments, in Block 404 a number of clusters is also supplied. The number of clusters may be provided by a user. In one or more embodiments, the number of clusters is learned while optimizing the composite objective function. In Block 406, a center of each cluster is established and each parameter in the initial parameter vector is assigned to one or more cluster centers. In accordance with one or more embodiments, the assignment of a parameter to a cluster is defined using a membership matrix.

Continuing with FIG. 4, in Block 408, a forward operator is applied to the initial parameter vector. The forward operator may be a function or computational model that maps the initial parameter vector to an observable quantity. For example, as discussed in FIG. 3, the forward operator may map a density vector to gravity measurements (observable data). As depicted in Block 410, the forward model produces predicted data. The predicted data are expected values for the observable quantity, as determined by the forward model, based on the initial parameter vector. In Block 412, an update to the initial parameter vector is determined. The update is determined, in part, by comparing the predicted data to observed data, where the observed data is represented by Block 413. The comparison is performed using a composite objective function. The composite objective function is composed of one or more functions that, at least, quantify the differences between the predicted data and the observed data and quantify a measure of the "spread" of the initial parameter vector with respect to the cluster centers defined in Block 406. In one or more embodiments, additional functions are included in the composite objective function. These additional functions may serve to further regularize the composite objective function and/or provide physics-based constraints on the initial parameter vector. As will be described in greater detail later in the instant disclosure, the composite objective function is used to determine an update to the initial parameter vector. In Block 414, a check is performed to determine if the update to the initial parameter vector is substantial. If the update to the initial parameter vector is not considered substantial, then application of the update to the initial parameter vector would not significantly alter the initial parameter vector. In such a case, the initial parameter vector is said to be converged. Thus, if according to Block 414, the initial parameter vector is converged, the clustering regularization method for single-domain inversion ends. If, however, the initial parameter vector is not converged, the update to the initial parameter vector is applied in Block 416.

Upon updating, the initial parameter vector is considered a new parameter vector. After Block 416, the clustering regularization method for single-domain inversion returns to Block 406 to determine the cluster centers and membership matrix for the new parameter vector. Additionally, the new parameter vector is processed by the forward operator in Block 406 which produces new predicted data. The new predicted data is compared to the observed data to determine an update to the new parameter vector in Block 412. If the update to the new parameter vector is significant (i.e., not converged), the parameter vector is updated (in Block 416) resulting in another new parameter vector. Without undue ambiguity, the new parameter vector (and subsequent updates to new parameter vector) can simply be referred to as the parameter vector. That is, in FIG. 4, after receiving an initial parameter vector, the parameter vector is updated iteratively until the parameter vector does not significantly change between iterations. Herein, the parameter vector is represented mathematically as m. Using this notation, an update to the parameter vector is represented as $\delta m$. In accordance with one or more embodiments, in Block 414, the parameter vector is considered converged if $|\delta m|<\epsilon$, where the operator $|\cdot|$ represents the $L_1$ norm ("Manhattan" norm) and $\epsilon$ is a pre-defined threshold value.

In accordance with one or more embodiments, the composite objective function is given as $$\phi(m{:}d_{obs}, m_p, v, U) = \phi_d(m{:}d_{obs}) + \lambda_1\phi_m(m{:}m_p) + \lambda_2\phi_{fcm}(m{:}v, U), \quad (2)$$

where $\phi_d$ is a measure of the data misfit, $\phi_m$ is a model regularization term, $\phi_{fcm}$ is the clustering term, and $\lambda_i$, i=1, . . . 2 are different Lagrange multipliers. The data misfit function $\phi_d$, intuitively, makes use of the observed data $d_{obs}$. The model regularization function $\phi_m$, in addition to the parameter vector, depends on a prior parameter vector $m_p$ (i.e., a prior subsurface model). The prior parameter vector includes any prior information known about the parameter vector. In one or more embodiments, the prior parameter vector is the same as the initial parameter vector. Finally, the value returned by the clustering function $\phi_{fcm}$ depends on the location of the centers of the clusters (represented by the vector v) and the membership matrix U.

In accordance with one or more embodiments, the misfit function $\phi_d$ of EQ. 2 is defined as $$\phi_d(m) = (d_{pre} - d_{obs})^T W_d^T W_d(d_{pre} - d_{obs}) = \|W_d(d_{pre} - d_{obs})\|_{L_2}^2, \quad (3)$$

where $d_{pre}$ is the predicted data vector obtained by processing the parameter vector with the forward operator and $W_d$ is a data weighting matrix that takes into consideration the relative relevance of the observations as a function of the data noise level.

In accordance with one or more embodiments, the model regularization function $\phi_m$ used in EQ. 2 measures the structural complexity of an inverted model. Specifically, the model regularization function $\phi_m$ is given as $$\phi_m(m) = (m - m_p)^T W_m^T W_m(m - m_p) = \|W_m(m - m_p)\|_{L_2}^2 \quad (4)$$

where $W_m$ is a model weighting matrix including a model smoothing operator.

Again, the last term in the composite objective function of EQ. 2 is the clustering term $\phi_{fcm}$. In accordance with one or more embodiments, the clustering technique employed by the clustering regularization method for single-domain inversion disclosed herein is fuzzy c-means (FCM) clustering. Subsequent descriptions of the clustering term $\phi_{fcm}$ will be provided under the context of FCM clustering. However, one skilled in the art will recognize that various clustering techniques may be readily used in the framework described herein such that the following description of FCM clustering does not impose a limitation on the clustering term $\phi_{fcm}$.

To describe the clustering term $\phi_{fcm}$ under the context of FCM clustering, consider the case where the number of clusters is given by K. Thus, the center of the $k_{th}$ cluster is given by $v_k$ where $1 \le k \le K$. Further, the parameter vector m is indexed by j such that $m_j$ refers to a single parameter (namely the $j^{th}$ parameter) in the parameter vector m. Because FCM clustering uses fuzzy clustering, the parameter $m_j$ can be associated with multiple clusters (of the K clusters), with varying degrees of membership defined by a membership matrix U. The membership matrix U contains only non-negative values and fulfills the relationship $$\sum_{k=1}^{K} U_{jk} = 1. \quad (5)$$

Using FCM clustering, the clustering term $\phi_{fcm}$ is given by $$\phi_{fcm}(m{:}\ v, U) = \|W_f f\|_{L_2}^2 \quad (6)$$

where $W_f$ is a weighting matrix and f is an FCM vector. The FCM vector f contains an aggregate measure of distance for each parameter in the parameter vector from the cluster centers. For a given parameter, the aggregate measure of distance is weighted relative to the membership of the parameter to the clusters. For a single parameter $m_j$ the aggregate measure of distance $f_j$ is given by $$f_j(m_j:\ U, v) = \sum_{k=1}^{K} U_{jk}^q D(m_j, v_k), \tag{7}$$

where D ($m_j$, $v_k$) returns the distance between the parameter $m_j$ and the cluster center $v_k$, and the exponent q is a fuzziness parameter subject to q≥1.

FIG. 4 depicts an iterative process. As such, it is useful to define an iteration counter. Herein, iterations of processes of FIG. 4 will be counted (or indexed) with i. For example, in one or more embodiments, the initial parameter vector may be referenced (using a zero-index notation) as $m_0$. Thus, the parameter vector of the $i^{th}$ iteration is given as $m_i$. In Block 412, an update to the parameter vector is determined. As previously discussed, the update is determined using the composite objective function by identifying an update $\delta_m$ that locally optimizes the composite objective function, where optimization may refer to minimization or maximation. That is, depending on the form of the composite objective function, the local optimization may seek to increase or decrease the composite objective function by applying the update to the parameter vector. Using the composite objective function of EQ. 2 as an example, it is desired that the parameter vector update δm, when applied (i.e., $m_{i+1}=m_i+\delta m$), reduces the composite objective function between iterations (i.e., $\phi(m_{i+1})<\phi(m_i)$). That is, the composite objective function of EQ. 2 is structured for minimization. However, one with ordinary skill in the art will recognize that minimization and maximization may be made equivalent with simple alterations such as negation of the composite objective function.

In accordance with one or more embodiments, the update vector δm is determined by expanding the composite objective function with a Taylor series expansion and performing a Gauss-Newton step. Using the composite objective function of EQ. 2 as an example, the Taylor series expansion of the composite objective function is written as $$\phi(m_{i+1}) = \phi_d(m_i + \delta m) + \lambda_1\phi_m(m_i + \delta m) + \lambda_2\phi_{FCM}(m_i + \delta \mathrm{m}), \tag{7}$$

where dependencies on $d_{obs}$, $m_p$, v, U are still present but not shown in EQ. 7 for concision. The data misfit function $\phi_d$ can be written as $$\phi_d(m_i + \delta m:\ d_{obs}) \approx \|W_d J\delta m + W_d(d_{pre} - d_{obs})_i\|_{L_2}^2. \tag{8}$$

Similarly, the regularization function $\phi_m$ can be written as $$\phi_m(m_k + \delta m:\ m_p) = \|W_m\delta m + W_m(m_k - m_p)\|_{L_2}^2. \tag{9}$$

To find $\phi_{FCM}(m_k+\delta m)$, the first-order Taylor series expansion is given as $$\phi_{FCM}(m_i + \delta m:\ v, U) = \|W_F(f_{i+1})\|_{L_2}^2 = [f_i + Fm_{i+1} - Fm_i]^T W_F^T W_F[f_i + Fm_{i+1} - Fm_i], \tag{10}$$

where F is a sensitivity matrix of the FCM clustering with respect to the parameter vector and $f_{i+1}$ and $f_i$ refer to the FCM vector f in EQ. 6 at the $(i+1)^{th}$ and $i^{th}$ iterations, respectively.

Given EQs. 8, 9, and 10, the gradient and Hessian of the data misfit function $\phi_d$, model regularization function Om, and clustering term $\phi_{fcm}$ with respect to the parameter vector can be determined. The gradient and the Hessian of the data misfit function $\phi_d$ are given as $$g_{\phi_d} = J^T W_d^T W_d(d_{pre} - d_{obs})_i, \tag{11}$$

and $$H_{\phi_d} = J^T W_d^T W_d J,$$

respectively, where J is the Jacobian of the predicted data vector $d_{pre}$ with respect to the parameter vector. The gradient and the Hessian of the model regularization function $\phi_m$ are given as $$g_{\phi_m} = W_m^T W_m(m_k - m_0), \tag{12}$$

and $$H_{\phi_m} = W_m^T W_m,$$

respectively. Finally, the gradient and the Hessian of the clustering term $\phi_{fcm}$ are given as $$g_{\phi_{fcm}} = F^T W_f^T W_f f_i, \tag{13}$$

and $$H_{\phi_{fcm}} = F^T W_f^T W_f F,$$

respectively.

Thus, the gradient and Hessian of the composite objective function of EQ. 2 are given as $$g = g_{\phi_d} + \lambda_1 g_{\phi_m} + \lambda_2 g_{\phi_{fcm}}, \tag{14}$$

and $$H = H_{\phi_d} + \lambda_1 H_{\phi_m} + \lambda_2 H_{\phi_{fcm}},$$

respectively. In accordance with one or more embodiments, the Gauss-Newton step $$H\,\delta m = -g \tag{15}$$

is solved using any solver (or solver method) known in the art to obtain the update vector δm. In one or more embodiments a pre-conditioned conjugate gradient (PCG) algorithm with a preconditioning matrix $P=[\mathrm{diag}(H)]^{-1}$ is used when solving the Gauss-Newton step of EQ. 15.

Figure 5:
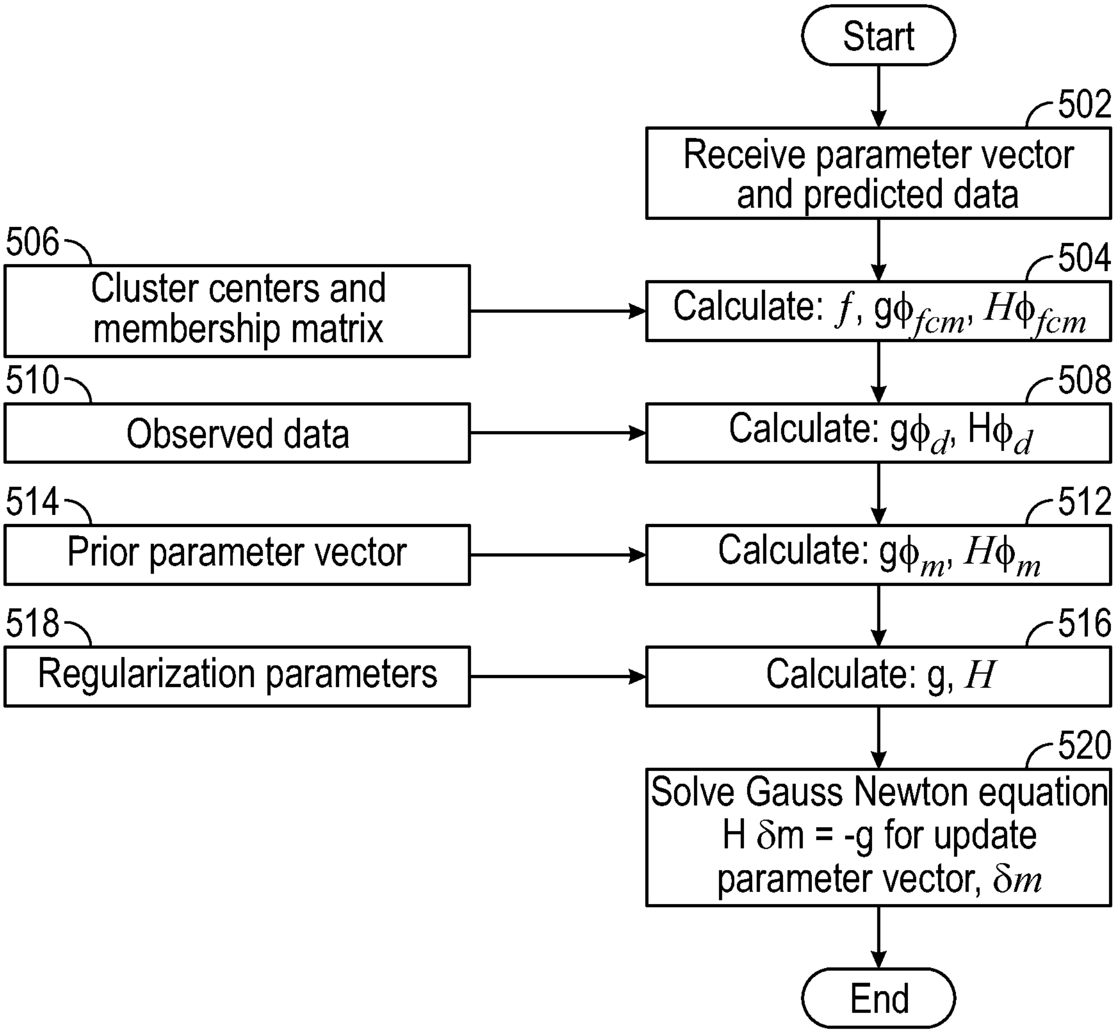
FIG. 5 depicts a flowchart in accordance with one or more embodiments.

The determination of the parameter vector update in Block 412 according to EQs. 11-15 is depicted in FIG. 5. In Block 502, the parameter vector and predicted data of the current iterations are received. In Block 504, the FCM vector f and the gradient and Hessian of the clustering term $\phi_{fcm}$ are calculated using EQs. 13 and 7. Calculation of these terms relies on the current cluster centers (vector v) and membership matrix U. As such, these items are provided as depicted by Block 506.

Next, in Block 508 the gradient and Hessian of the misfit function $\phi_d$ are calculated according to EQ. 11. The observed data $d_{obs}$ are needed to compute these quantities and is provided in Block 510. In Block 512, the gradient and Hessian of the model regularization function $\phi_m$ are calculated according to EQ. 12. The prior parameter vector $m_p$ is provided for these calculations in Block 514. Using the quantities calculated in Blocks 504, 508, and 512, the gradient and Hessian of the composite objective function is calculated in Block 516. Block 518 supplies the regularization parameters $\lambda_1$ and $\lambda_2$ to Block 516. In Block 520, the Gauss-Newton step is solved to determine the parameter vector update δm for the current iteration.

While the various blocks in FIG. 5 are presented and described sequentially, one of ordinary skill in the art will appreciate that some or all of the blocks may be executed in different orders, may be combined or omitted, and some or all of the blocks may be executed in parallel. Furthermore, the blocks may be performed actively or passively.

Figure 6:
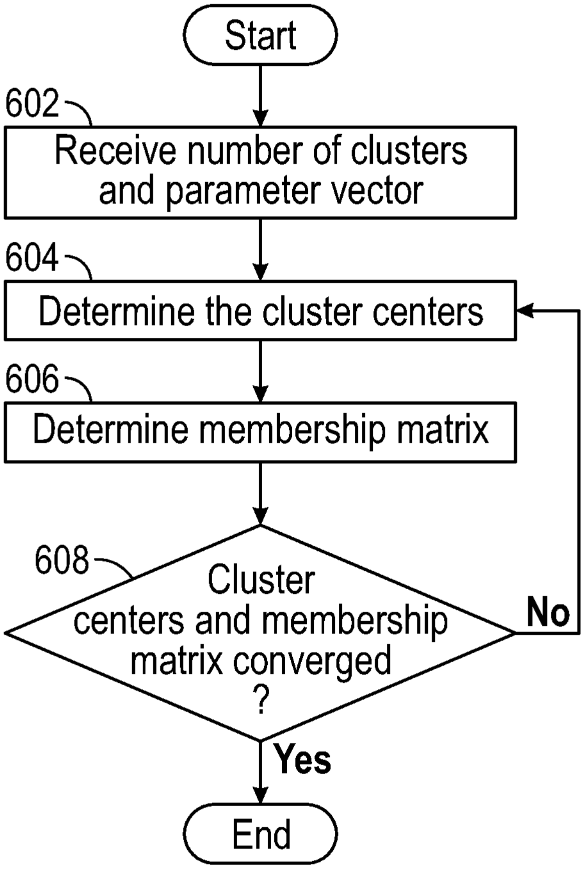
FIG. 6 depicts a flowchart in accordance with one or more embodiments.

As previously stated, in one or more embodiments, the clustering technique used is FCM clustering. Given a parameter vector, the determination of cluster centers and membership matrix using FCM clustering is depicted in FIG. 6. In Block 602, a parameter vector m and a number of clusters K are received. In Block 604, the cluster centers v are determined, where the center of the $k^{th}$ is determined according to $$v_k = \frac{\sum_j U_{jk}^q m_j}{\sum_j U_{jk}^q}. \tag{15}$$

Note that to calculate the cluster centers, the membership matrix is required. If a previous (i.e., from the previous iteration) membership matrix is not available (e.g., operating on the initial parameter vector) then a uniform membership matrix may be used $$\left(\text{i.e., } U_{jk} = \frac{1}{K} \forall j\right).$$

In Block 606, the membership matrix is determined according to $$U_{jk} = \frac{\|m_j - v_k\|^{\frac{-2}{q-1}}}{\sum_{n=1}^{K} \|m_j - v_n\|^{\frac{-2}{q-1}}}. \tag{16}$$

Again, note that the membership matrix depends on the cluster centers. Due to the interdependency of the cluster centers and membership matrix, Blocks 604 and 606 are repeated iteratively until the cluster centers and membership matrix each converge. The convergence is checked in Block 608. Convergence is checked by comparing the differences between the cluster centers and membership matrix between consecutive iterations of Blocks 604 and 606 to a center threshold $\epsilon_c$ and a membership threshold $\epsilon_m$, respectively. In one or more embodiments, the convergence of Block 608 is satisfied when $|v_{n+1}-v_n|<\epsilon_c$ and $|U_{n+1}-U_n|<\epsilon_m$, where n is an iteration counter for the iterative sequence defined by Block 604, 606, and 608 of FIG. 6. Once both the cluster centers and membership matrix are converged, as determined by Block 608, the processes depicted in FIG. 6 terminate.

Figure 7A:
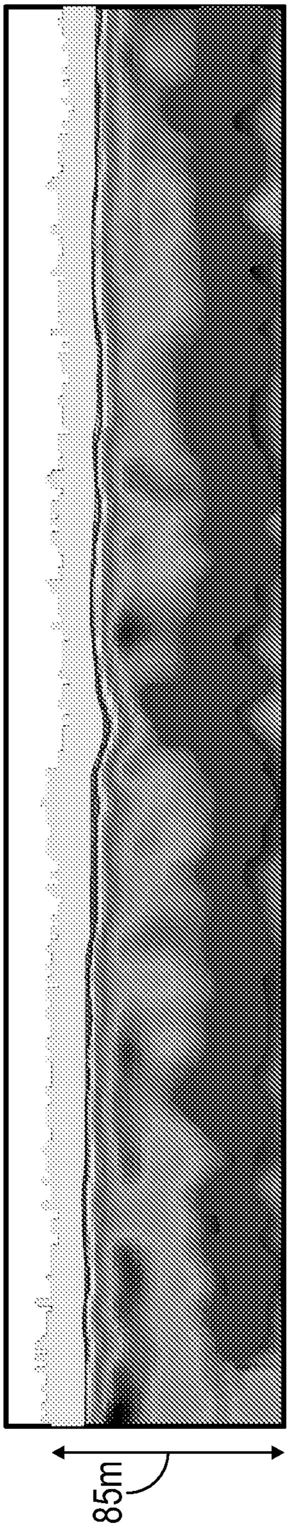
FIG. 7A depicts a subsurface property model in accordance with one or more embodiments.
Figure 7B:
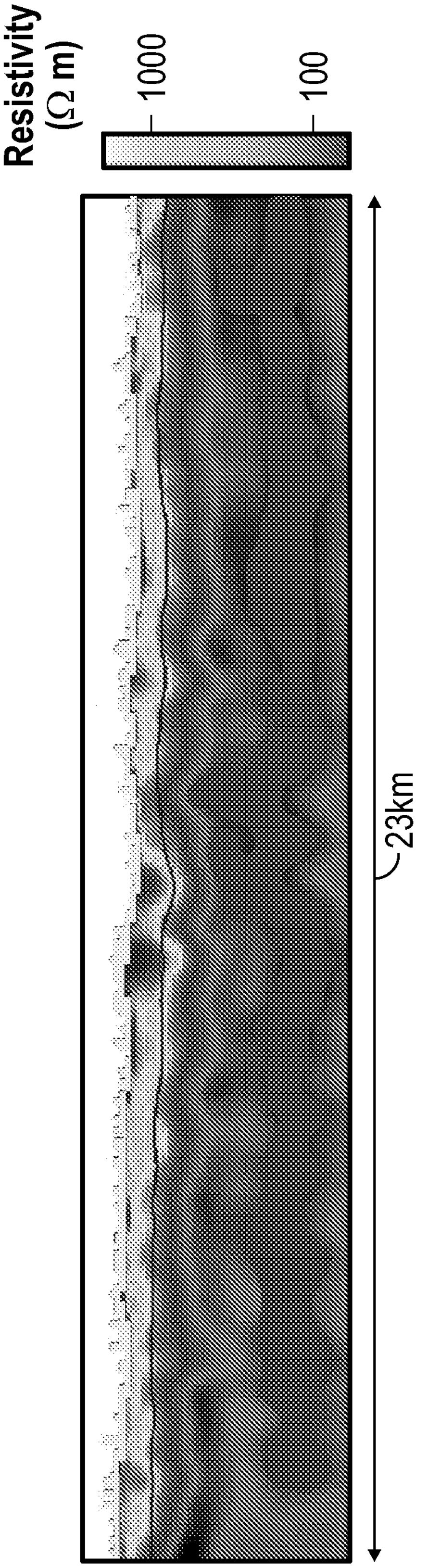
FIG. 7B depicts a subsurface property model in accordance with one or more embodiments.

FIGS. 7A and 7B compare the results of single-domain inversion for subsurface resistivity with and without the use of the clustering regularization method described herein. Using transient electromagnetic data acquired in a sand dune environment, an inversion is performed to determine the spatial distribution of resistivity in the subsurface. That is, in the example of FIGS. 7A and 7B, the parameter vector represents the resistivity of the subsurface and the observed data are electromagnetic data. Using the clustering regularization method for single-domain inversion described herein, FIG. 7A depicts the determined spatial distribution of resistivity. As seen in FIG. 7A, the determined subsurface resistivity model recovers a distinct high resistivity cluster and low resistivity cluster. As such, the resistivity model depicted in FIG. 7A is able to identify the base of the sand dividing the sand near the surface and the Sabkhas below. Whereas the resistivity model determined using a conventional inversion method, depicted in FIG. 7B, cannot recover the resistivity model with a specific number of clusters and is unable to identify the base of the sand.

Figure 8A:
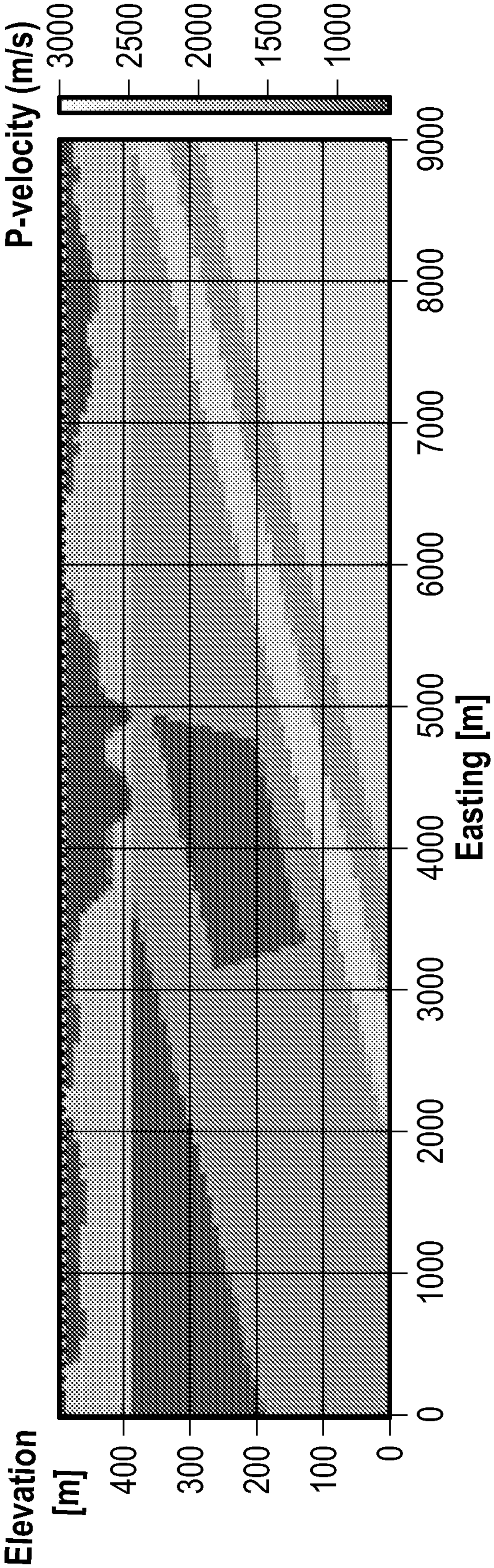
FIG. 8A depicts a synthetic velocity subsurface model in accordance with one or more embodiments.
Figure 8B:
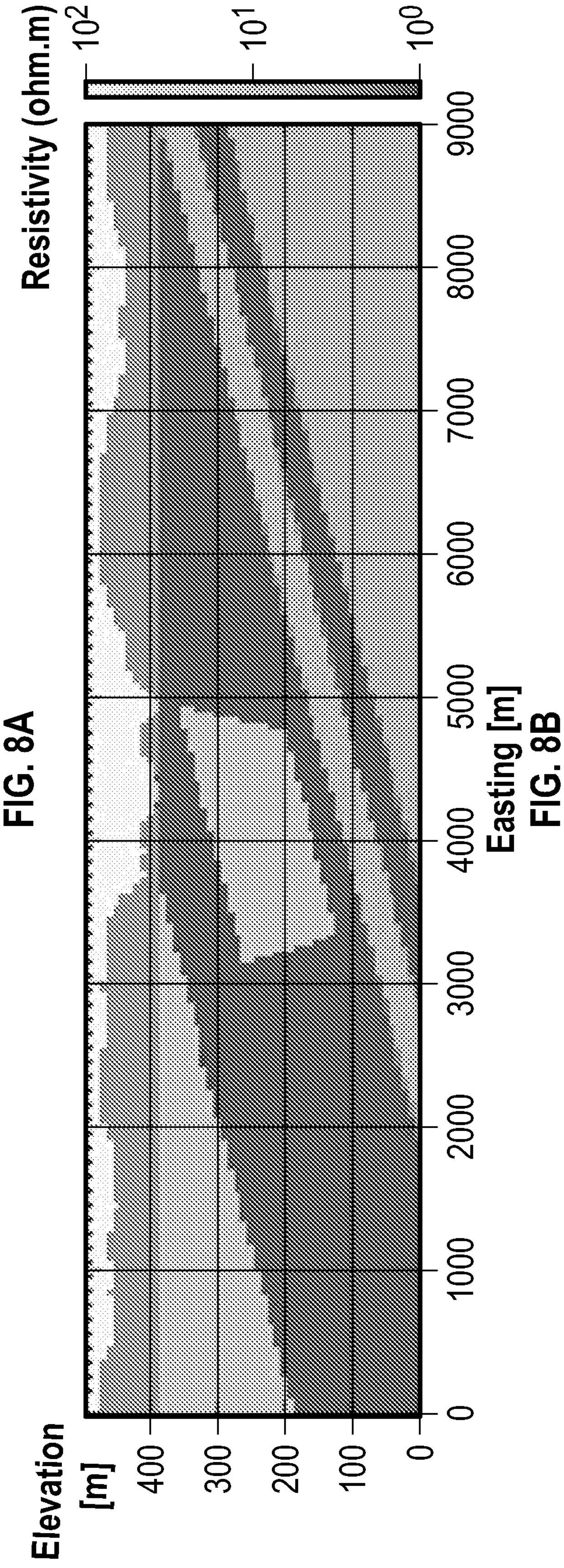
FIG. 8B depicts a synthetic resistivity subsurface model in accordance with one or more embodiments.

In one or more embodiments, the clustering regularization method disclosed herein is extended for use with multiple domains. This capability is demonstrated by means of example. The example consists of determining a near-surface velocity model, including the base of sand (BOS), using a synthetic multi-physics model consisting of a velocity model and resistivity model. That is, the accuracy of the multi-domain inversion method may be assessed because the true subsurface models are known (synthetic data). FIG. 8A depicts the synthetic velocity subsurface model. The synthetic velocity subsurface model includes a low velocity sand layer with some topography at the base of sand (BOS). The synthetic velocity subsurface model is characterized by velocity inversions with a dipping low velocity layer and large velocity contrasts. FIG. 8B depicts the synthetic resistivity subsurface model. The synthetic resistivity subsurface model has the same grid resolution and structure as the synthetic velocity subsurface model. For the synthetic resistivity subsurface model, the background resistivity value is calculated using a rock physics relation derived from a regression of velocity-resistivity cross-plots from well log data, acquired in a sand dune environment. Mathematically, the relationship is given as $$r = 10^{-11} V_p^{3.56}, \tag{17}$$

where r is the electrical resistivity in Ωm and Vp is the P-wave velocity in m/s. As seen in EQ. 17, the relationship between resistivity and velocity takes the form of a power law. The resistivity of the shallow layer and the central anomaly is estimated using a resistivity model derived from TDM inversion. As seen in FIG. 8B, the synthetic resistivity subsurface model is characterized by a high resistivity sand layer and a less resistive anomaly in the middle.

Synthetic observable data was generated with a simulated seismic survey consisting of 88 seismic sources and 87 seismic receivers spaced 100 meters apart. In particular, the eikonal equation was used to simulate the synthetic P-wave first arrival times (i.e., the synthetic observable data). Gaussian noise with zero mean and 20 ms standard deviation was added to the synthetic first arrival times.

Figure 9A:
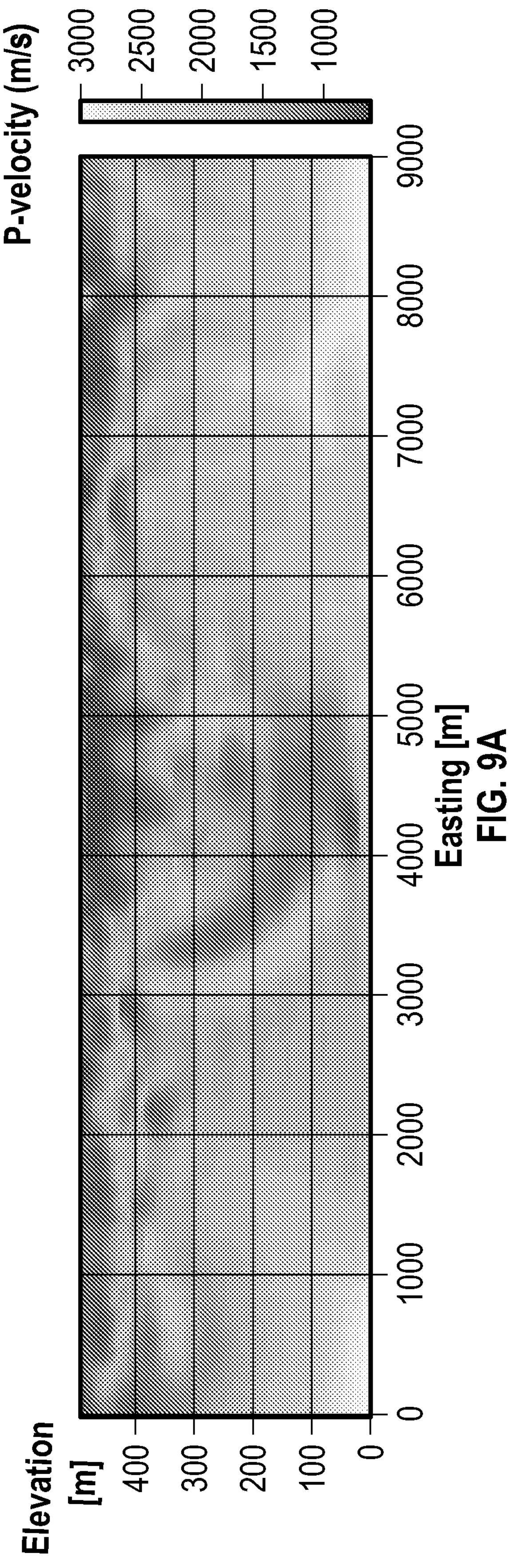
FIG. 9A depicts a velocity subsurface model determined with conventional tomography in accordance with one or more embodiments.

FIG. 9A depicts the velocity subsurface model determined from the synthetic first travel times using conventional seismic tomography. As seen in FIG. 9A, the determined velocity subsurface model has shallow inversion artifacts and does not recover the western dipping layer. This is due to a limitation in traveltime tomography, which is insensitive to low velocity layers hidden behind high velocity layers (hidden layer). As a result, the ray coverage distribution reveals that large areas of the velocity subsurface model are undersampled. Because of the limitation of coverage, certain parts of the velocity subsurface model are not recovered. When the traveltime residuals are utilized to update the velocity, the velocities in other portions of the model are incorrect.

Figure 9B:
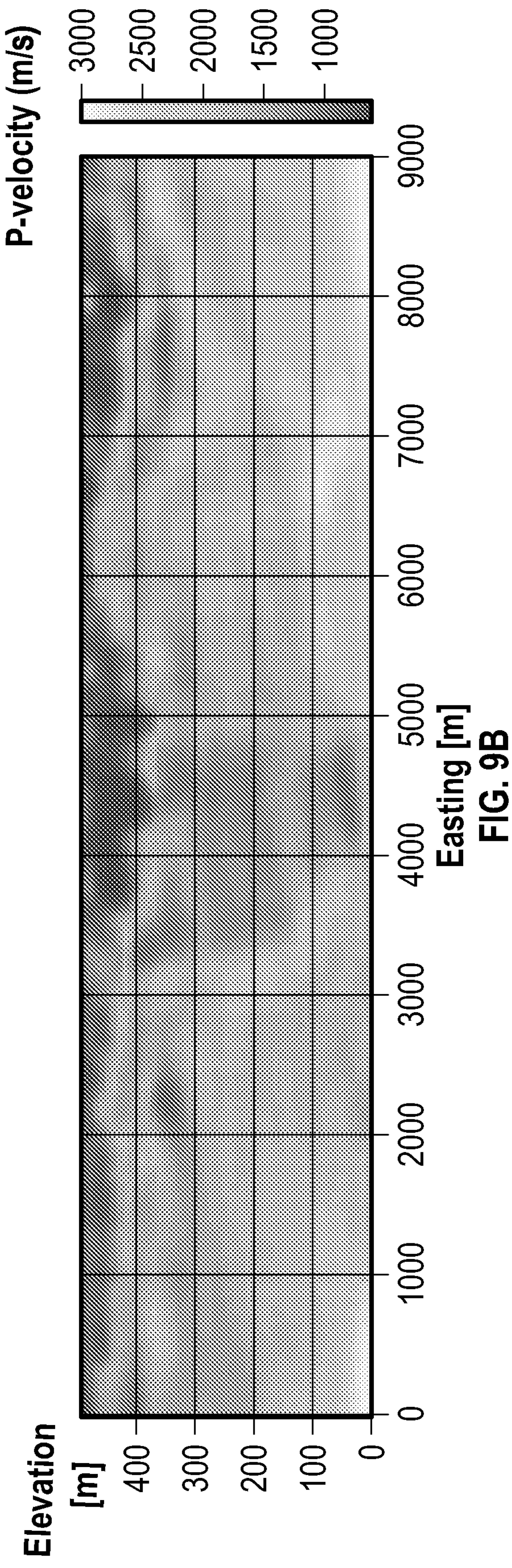
FIG. 9B depicts a velocity subsurface model determined with multi-domain clustering regularization inversion in accordance with one or more embodiments.

The clustering regularization method is extended to leverage prior information supplied by the true synthetic resistivity subsurface model during the inversion of the velocity subsurface model. FIG. 9B depicts velocity subsurface model determined from the synthetic first travel times while using clustering regularization applied to the synthetic resistivity subsurface model. As depicted in FIG. 9B the recovered velocity subsurface model can extract the structure and clustering information of the reference model (i.e., the resistivity subsurface model). Further, the resulting velocity subsurface model can recover the dipping layers in the eastern and western parts of the subsurface model, which are missing in the velocity subsurface model produced using conventional tomography (FIG. 9A). As such, inversion artifacts are reduced in the velocity subsurface model determined using a multi-domain clustering regularization inversion.

Figure 10:
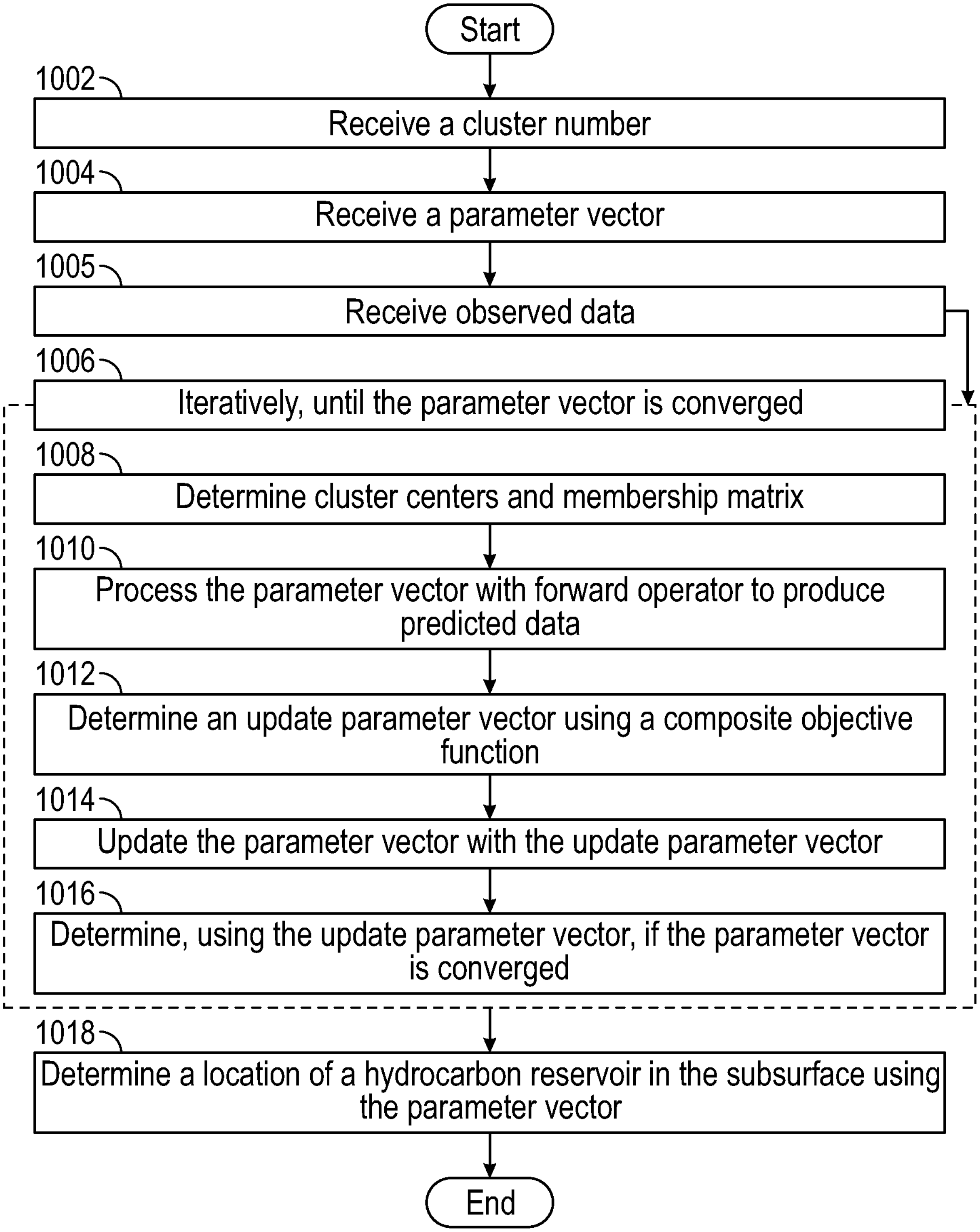
FIG. 10 depicts a flowchart in accordance with one or more embodiments.

FIG. 10 depicts a flow chart outlining the processes of the clustering regularization inversion method disclosed herein, in accordance with one or more embodiments. In Block 1002, a cluster number is received. The cluster number specifies the number of clusters used. In one or more embodiments, the cluster number is supplied by a user. In Block 1004, a parameter vector is received. The parameter vector represents the spatial distribution of a property over a subsurface. That is, the parameter vector represents a subsurface model for a single quantity. In Block 1005, observed data is received. The observed data consists of measurements of a quantity or property that is affected by the subsurface property of interest. As depicted by Block 1006, Blocks 1008, 1010, 1012, 1014, and 1016 are performed iteratively until the parameter vector is converged. In one or more embodiments, the parameter vector is considered converged when the Manhattan norm of the update parameter vector is less than a given threshold. In Block 1008, for each of the clusters, where the number of clusters is given by the cluster number, a cluster center is determined. Further, the membership matrix is determined, where the membership matrix defines an association of each parameter contained by the parameter vector with the clusters. The cluster centers and membership matrix are determined according to a clustering technique where any known clustering technique or algorithm may be employed. In one or more embodiments, the clustering technique used is FCM clustering and the process for determining the cluster centers and membership matrix is outlined in FIG. 6. In Block 1010, the parameter vector is processed with a forward operator. The forward operator is a function or computational model that maps a subsurface model to expected observable values. Thus, upon processing the parameter vector, the forward operator produces predicted data. The predicted data is of the same type as the observed data. In Block 1012, an update parameter vector is determined. The update parameter vector is determined using a composite objective function, where the update parameter vector is such that when applied to the parameter vector results in a reduction of the composite objective function. The composite objective function includes, at least, a data misfit function and a clustering term. The data misfit function quantifies the difference between the predicted data and the observed data. The clustering term quantifies the distance between the parameter vector and the cluster centers weighted by the membership matrix. In one or more embodiments, the update parameter vector is determined by performing a Gauss-Newton step on the composite objective function, or a locally linear approximation of the composite objective function. In Block 1014, the parameter vector is updated using the update parameter vector. The update is applied by simply adding the update parameter vector to the parameter vector. In Block 1016, the convergence of the parameter vector is checked. In one or more embodiments, the convergence of the parameter vector is determined through evaluation of the update parameter vector. Once the parameter vector has converged, the processes of FIG. 10 exit the iterative block encompassed by Block 1006 and proceed to Block 1018. In Block 1018, using the parameter vector, which represents a subsurface model, a location of a hydrocarbon reservoir in the subsurface is determined. In one or more embodiments, the subsurface model (i.e., parameter vector) is used in a reservoir simulator to estimate well production performance metrics. In one or more embodiments, the subsurface model (i.e., parameter vector) is used by a wellbore planning system (199) to plan a wellbore path for a new well. Further, in one or more embodiments, a drilling system, such as that depicted in FIG. 1, is used to drill a wellbore according to the planned wellbore path.

Figure 11:
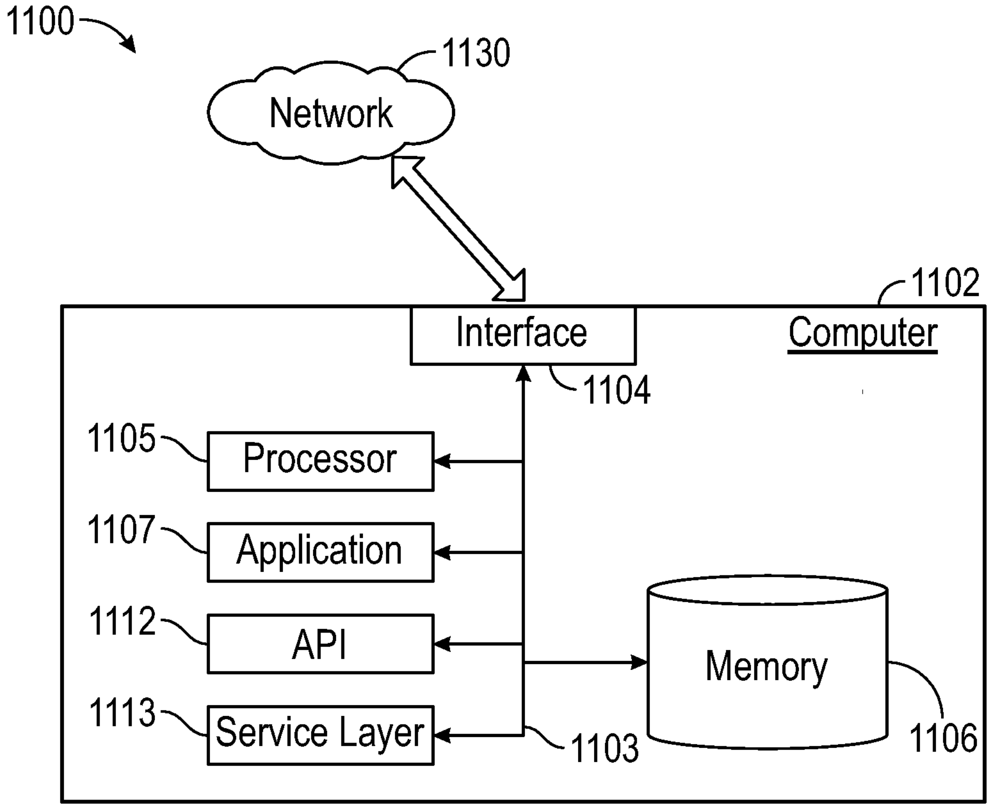
FIG. 11 depicts a computer system in accordance with one or more embodiments.

FIG. 11 shows a system in accordance with one or more embodiments. FIG. 11 depicts a block diagram of the computer system (1102) used to provide computational functionalities associated with described algorithms, methods, functions, processes, flows, and procedures as described in this disclosure, according to one or more embodiments. The illustrated computer (1102) is intended to encompass any computing device such as a server, desktop computer, laptop/notebook computer, wireless data port, smart phone, personal data assistant (PDA), tablet computing device, one or more processors within these devices, or any other suitable processing device, including both physical or virtual instances (or both) of the computing device. Additionally, the computer (1102) may include a computer that includes an input device, such as a keypad, keyboard, touch screen, or other device that can accept user information, and an output device that conveys information associated with the operation of the computer (1102), including digital data, visual, or audio information (or a combination of information), or a Graphical User Interface (GUI).

The computer (1102) can serve in a role as a client, network component, a server, a database or other persistency, or any other component (or a combination of roles) of a computer system for performing the subject matter described in the instant disclosure. The illustrated computer (1102) is communicably coupled with a network (1130). In some implementations, one or more components of the computer (1102) may be configured to operate within environments, including cloud-computing-based, local, global, or other environment (or a combination of environments).

At a high level, the computer (1102) is an electronic computing device operable to receive, transmit, process, store, or manage data and information associated with the described subject matter. According to some implementations, the computer (1102) may also include or be communicably coupled with an application server, e-mail server, web server, caching server, streaming data server, business intelligence (BI) server, or other server (or a combination of servers).

The computer (1102) can receive requests over network (1130) from a client application (for example, executing on another computer (1102)) and responding to the received requests by processing the said requests in an appropriate software application. In addition, requests may also be sent to the computer (1102) from internal users (for example, from a command console or by other appropriate access method), external or third-parties, other automated applications, as well as any other appropriate entities, individuals, systems, or computers.

Each of the components of the computer (1102) can communicate using a system bus (1103). In some implementations, any or all of the components of the computer (1102), both hardware or software (or a combination of hardware and software), may interface with each other or the interface (1104) (or a combination of both) over the system bus (1103) using an application programming interface (API) (1112) or a service layer (1113) (or a combination of the API (1112) and service layer (1113). The API (1112) may include specifications for routines, data structures, and object classes. The API (1112) may be either computer-language independent or dependent and refer to a complete interface, a single function, or even a set of APIs. The service layer (1113) provides software services to the computer (1102) or other components (whether or not illustrated) that are communicably coupled to the computer (1102). The functionality of the computer (1102) may be accessible for all service consumers using this service layer. Software services, such as those provided by the service layer (1113), provide reusable, defined business functionalities through a defined interface. For example, the interface may be software written in JAVA, C++, or other suitable language providing data in extensible markup language (XML) format or another suitable format. While illustrated as an integrated component of the computer (1102), alternative implementations may illustrate the API (1112) or the service layer (1113) as stand-alone components in relation to other components of the computer (1102) or other components (whether or not illustrated) that are communicably coupled to the computer (1102). Moreover, any or all parts of the API (1112) or the service layer (1113) may be implemented as child or sub-modules of another software module, enterprise application, or hardware module without departing from the scope of this disclosure.

The computer (1102) includes an interface (1104). Although illustrated as a single interface (1104) in FIG. 11, two or more interfaces (1104) may be used according to particular needs, desires, or particular implementations of the computer (1102). The interface (1104) is used by the computer (1102) for communicating with other systems in a distributed environment that are connected to the network (1130). Generally, the interface (1104) includes logic encoded in software or hardware (or a combination of software and hardware) and operable to communicate with the network (1130). More specifically, the interface (1104) may include software supporting one or more communication protocols associated with communications such that the network (1130) or interface's hardware is operable to communicate physical signals within and outside of the illustrated computer (1102).

The computer (1102) includes at least one computer processor (1105). Although illustrated as a single computer processor (1105) in FIG. 11, two or more processors may be used according to particular needs, desires, or particular implementations of the computer (1102). Generally, the computer processor (1105) executes instructions and manipulates data to perform the operations of the computer (1102) and any algorithms, methods, functions, processes, flows, and procedures as described in the instant disclosure.

The computer (1102) also includes a memory (1106) that holds data for the computer (1102) or other components, such as computer executable instructions, (or a combination of both) that can be connected to the network (1130). The memory (1106) may be non-transitory computer readable memory. For example, memory (1106) can be a database storing data consistent with this disclosure. Although illustrated as a single memory (1106) in FIG. 11, two or more memories may be used according to particular needs, desires, or particular implementations of the computer (1102) and the described functionality. While memory (1106) is illustrated as an integral component of the computer (1102), in alternative implementations, memory (1106) can be external to the computer (1102).

The application (1107) is an algorithmic software engine providing functionality according to particular needs, desires, or particular implementations of the computer (1102), particularly with respect to functionality described in this disclosure. For example, application (1107) can serve as one or more components, modules, applications, etc. Further, although illustrated as a single application (1107), the application (1107) may be implemented as multiple applications (1107) on the computer (1102). In addition, although illustrated as integral to the computer (1102), in alternative implementations, the application (1107) can be external to the computer (1102).

There may be any number of computers (1102) associated with, or external to, a computer system containing computer (1102), wherein each computer (1102) communicates over network (1130). Further, the term "client," "user," and other appropriate terminology may be used interchangeably as appropriate without departing from the scope of this disclosure. Moreover, this disclosure contemplates that many users may use one computer (1102), or that one user may use multiple computers (1102).

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims.

What is claimed is:

1. A method, comprising:

receiving a cluster number, wherein the cluster number specifies a number of clusters in a plurality of clusters;

receiving a parameter vector, wherein the parameter vector represents a spatial distribution of a property over a subsurface;

receiving observed data, wherein the property distributed over the subsurface represented by the parameter vector causes an effect in the observed data;

iteratively, until the parameter vector is converged:

determining a cluster center for each cluster in the plurality of clusters;

determining a membership matrix, wherein the membership matrix relates the parameter vector to the plurality of clusters, processing the parameter vector with a forward operator to produce predicted data, determining an update parameter vector guided by a composite objective function, wherein the composite objective function comprises:

a data misfit function that quantifies a difference between the predicted data and the observed data; and a clustering term based on the parameter vector and the cluster centers, updating the parameter vector with the update parameter vector, and determining, using the update parameter vector, if the parameter vector is converged; and determining a location of a hydrocarbon reservoir in the subsurface using the parameter vector.

2. The method of claim 1, further comprising planning a wellbore to penetrate the hydrocarbon reservoir based on the location, wherein the planned wellbore comprises a planned wellbore path.

3. The method of claim 2, further comprising drilling the wellbore guided by the planned wellbore path.

4. The method of claim 1, further comprising receiving a prior parameter vector.

5. The method of claim 4, wherein the composite objective function further comprises a model regularization function that quantifies the difference between the parameter vector and the prior parameter vector.

6. The method of claim 1, wherein the cluster centers and membership matrix are determined using a fuzzy c-means clustering technique.

7. The method of claim 1, wherein the property is resistivity.

8. The method of claim 1, wherein the parameter vector is converged if a Manhattan norm of the update parameter vector is less than a threshold.

9. The method of claim 1, wherein the clustering term quantifies a distance between the parameter vector and the cluster centers weighted by the membership matrix.

10. A non-transitory computer-readable memory comprising computer-executable instructions stored thereon that, when executed on a processor, cause the processor to perform steps comprising:

receiving a cluster number, wherein the cluster number specifies a number of clusters in a plurality of clusters;

receiving a parameter vector, wherein the parameter vector represents a spatial distribution of a property over a subsurface;

receiving observed data, wherein the property distributed over the subsurface represented by the parameter vector causes an effect in the observed data;

iteratively, until the parameter vector is converged:

determining a cluster center for each cluster in the plurality of clusters and determining a membership matrix, wherein the membership matrix relates the parameter vector to the plurality of clusters, processing the parameter vector with a forward operator to produce predicted data, determining an update parameter vector guided by a composite objective function, wherein the composite objective function comprises:

a data misfit function that quantifies a difference between the predicted data and the observed data; and a clustering term based on the parameter vector and the cluster centers, updating the parameter vector with the update parameter vector, and determining, using the update parameter vector, if the parameter vector is converged; and determining a location of a hydrocarbon reservoir in the subsurface using the parameter vector.

11. The non-transitory computer-readable memory of claim 10, further comprising generating a wellbore plan, wherein the wellbore plan comprises a planned wellbore path that intersects the hydrocarbon reservoir based on the location.

12. The non-transitory computer-readable memory of claim 10, further comprising receiving a prior parameter vector.

13. The non-transitory computer-readable memory of claim 10, wherein the composite objective function further comprises a model regularization function that quantifies a difference between a parameter vector and the prior parameter vector.

14. The non-transitory computer-readable memory of claim 10, wherein the cluster centers and membership matrix are determined using a fuzzy c-means clustering technique.

15. The non-transitory computer-readable memory of claim 10, wherein the property is resistivity.

16. The non-transitory computer-readable memory of claim 10, wherein the parameter vector is converged if a Manhattan norm of the update parameter vector is less than a threshold.

17. The non-transitory computer-readable memory of claim 10, wherein the clustering term quantifies a distance between the parameter vector and the cluster centers weighted by the membership matrix.

18. A system, comprising a computer processor configured to:

receive a cluster number, wherein the cluster number specifies a number of clusters in a plurality of clusters;

receive a parameter vector, wherein the parameter vector represents the spatial distribution of a property over a subsurface;

receive observed data, wherein the property distributed over the subsurface represented by the parameter vector causes an effect in the observed data;

iteratively, until the parameter vector is converged:

determine a cluster center for each cluster in the plurality of clusters and determine a membership matrix, wherein the membership matrix relates the parameter vector to the plurality of clusters, process the parameter vector with a forward operator to produce predicted data, determine an update parameter vector guided by a composite objective function, wherein the composite objective function comprises:

a data misfit function that quantifies the difference between the predicted data and the observed data; and a clustering term based on the parameter vector and the cluster centers, update the parameter vector with the update parameter vector, and determine, using the update parameter vector, if the parameter vector is converged; and determine a location of a hydrocarbon reservoir in the subsurface using the parameter vector.

19. The system of claim 18, further comprising a wellbore planning system configured to plan a wellbore to penetrate the hydrocarbon reservoir based on the location, wherein the planned wellbore comprises a planned wellbore path.

20. The system of claim 19, further comprising a wellbore drilling system configured to drill a wellbore guided by the planned wellbore path.

* * * * *